United States Patent
Imamura et al.

(10) Patent No.: US 8,236,460 B2
(45) Date of Patent: Aug. 7, 2012

(54) FUEL CELL SYSTEM

(75) Inventors: Tomonori Imamura, Nagoya (JP);
Kenichiro Sasamoto, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 532 days.

(21) Appl. No.: 12/524,487

(22) PCT Filed: May 8, 2008

(86) PCT No.: PCT/JP2008/058890
§ 371 (c)(1),
(2), (4) Date: Jul. 24, 2009

(87) PCT Pub. No.: WO2008/143112
PCT Pub. Date: Nov. 27, 2008

(65) Prior Publication Data
US 2010/0112398 A1    May 6, 2010

(30) Foreign Application Priority Data
May 10, 2007    (JP) .................................. 2007-125448

(51) Int. Cl.
*H01M 8/06* (2006.01)
*H01M 8/04* (2006.01)
(52) U.S. Cl. ........................................ 429/430; 429/414
(58) Field of Classification Search .................. 429/414, 429/428–432
See application file for complete search history.

(56) References Cited

U.S. PATENT DOCUMENTS

| | | | |
|---|---|---|---|
| 2001/0055707 A1 | 12/2001 | Roberts et al. | |
| 2005/0170228 A1 | 8/2005 | Tajiri et al. | |
| 2005/0287402 A1* | 12/2005 | Maly et al. | ...... 429/13 |
| 2006/0222924 A1 | 10/2006 | Matsuoka | |

FOREIGN PATENT DOCUMENTS

| | | |
|---|---|---|
| EP | 1 840 995 A1 | 10/2007 |
| JP | 2002-246053 A | 8/2002 |
| JP | 2004-179086 A | 6/2004 |
| JP | 2005-339845 A | 12/2005 |
| JP | 2005-353425 A | 12/2005 |
| JP | 2005-353438 A | 12/2005 |
| JP | 2006-19184 A | 1/2006 |
| JP | 2006-156085 A | 6/2006 |

OTHER PUBLICATIONS

Extended European Search Report dated May 23, 2011.

* cited by examiner

*Primary Examiner* — Eugenia Wang
(74) *Attorney, Agent, or Firm* — Kenyon & Kenyon LLP (57) ABSTRACT

A fuel cell system includes: an AC impedance measuring unit which measures an AC impedance of a fuel cell at a scavenging start and measures an AC impedance of the fuel cell when a predetermined time has elapsed from the scavenging start; a scavenging execution time estimation unit which estimates a scavenging execution time based on the AC impedance measured at the scavenging start, the AC impedance measured at the time when the predetermined time has elapsed from the scavenging start and the predetermined time; and a limit unit which limits the scavenging execution time to a predetermined maximum scavenging time if the scavenging execution time exceeds the maximum scavenging time.

5 Claims, 6 Drawing Sheets

FUEL CELL SYSTEM

This is a 371 national phase application of PCT/JP2008/058890 filed 8 May 2008, which claims priority to Japanese Patent Application No. 2007-125448 filed 10 May 2007, the contents of which are incorporated herein by reference.

TECHNICAL FIELD

The present invention relates to a fuel cell system which receives a supplied reactant gas to generate a power.

BACKGROUND ART

A fuel cell stack is an energy conversion system for supplying a fuel gas and an oxidizing gas to a membrane-electrode assembly to cause an electrochemical reaction, thereby converting chemical energy into electric energy. Above all, a solid polymer electrolyte type fuel cell stack in which a solid polymer film is used as an electrolyte is easily made compact at a low cost, and additionally it has a high output density, so that the use application of the stack as a car-mounted power source is expected.

In a gas passage of the fuel cell stack, formed water generated by the electrochemical reaction of a reactant gas, humidification water for humidifying the reactant gas and the like remain. If power generation is stopped while leaving this remaining water, the remaining water freezes in an environment at a low temperature, the diffusion of the reactant gas to the membrane-electrode assembly is prevented, and low-temperature starting properties lower. In view of such a problem, in Japanese Patent Application Laid-Open No. 2002-246053, a technique is suggested which supplies a scavenging gas into the fuel cell stack at an operation stop to remove a water content and which measures an AC impedance of the fuel cell stack to judge the dry degree of an electrolytic film.

[Patent Document 1] Japanese Patent Application Laid-Open No. 2002-246053

DISCLOSURE OF THE INVENTION

However, in a fuel cell system having a function of estimating a scavenging execution time based on an AC impedance of a fuel cell stack measured at a scavenging start and an AC impedance of the fuel cell stack measured at a time when a predetermined time has elapsed from the scavenging start, in a case where a large water content remains in a fuel cell at the scavenging start, there occurs a disadvantage that the fuel cell stack cannot sufficiently be dried during scavenging execution.

To solve the above problem, an object of the present invention is to provide a fuel cell system capable of decreasing a water content in a fuel cell as much as possible in preparation for the next startup.

To achieve the above object, a fuel cell system according to the present invention comprises a fuel cell; a scavenging device which supplies a scavenging gas to the fuel cell; an AC impedance measuring unit which measures an AC impedance of the fuel cell at a scavenging start and which measures an AC impedance of the fuel cell at a time when a predetermined time has elapsed from the scavenging start; a scavenging execution time estimation unit which estimates a scavenging execution time based on the AC impedance measured at the scavenging start, the AC impedance measured at the time when the predetermined time has elapsed from the scavenging start and the predetermined time; and a limit unit which limits the scavenging execution time to a predetermined maximum scavenging time if the scavenging execution time exceeds the maximum scavenging time.

In a case where a large water content remains in the fuel cell at the scavenging start, scavenging processing is performed until the scavenging execution time reaches the maximum scavenging time, whereby the water content in the fuel cell can be decreased as much as possible in preparation for the next startup.

Here, the scavenging execution time estimation unit preferably estimates the scavenging execution time by use of an interpolating function. The change of the AC impedance with an elapse of time during the scavenging processing can be approximated to a specific function curve, so that estimation precision can be improved by using the interpolating function.

The time when the predetermined time has elapsed from the scavenging start may be a time when the absolute value of the temperature change rate of the fuel cell becomes less than a predetermined threshold value, or a predetermined fixed time. The AC impedance is measured at a time when it is anticipated that the water content in the fuel cell lowers as much as possible, whereby the estimation precision of the scavenging execution time can be improved.

BEST MODE FOR CARRYING OUT THE INVENTION

Hereinafter, an embodiment according to the present invention will be described with reference to the drawings.

Figure 1:
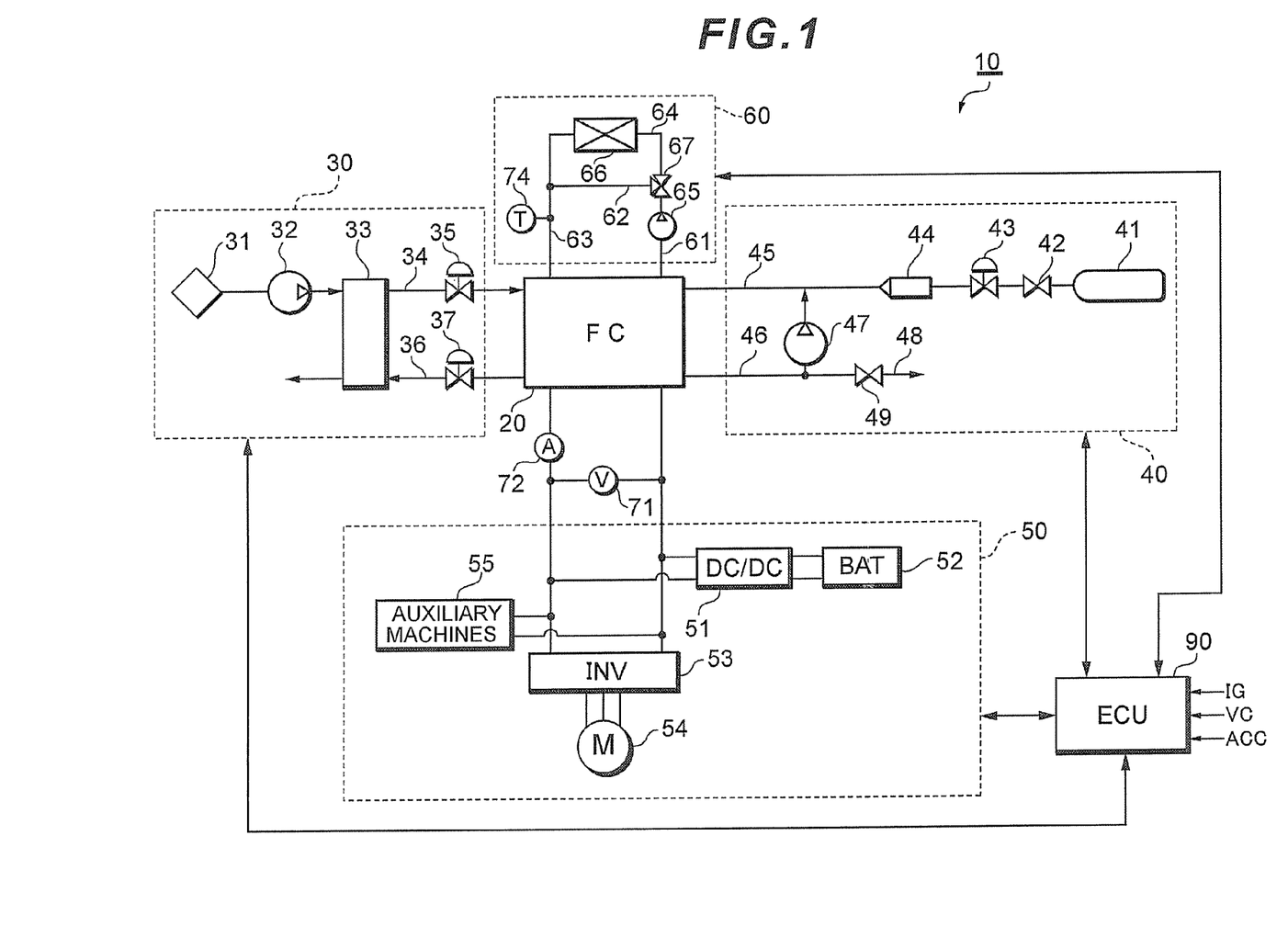
FIG. 1 is a constitution diagram of a fuel cell system according to the present embodiment.

FIG. 1 shows a system constitution of a fuel cell system 10 according to the present embodiment.

The fuel cell system 10 functions as a car-mounted power source system mounted on a fuel cell vehicle, and includes a fuel cell stack 20 which receives a supplied hydrogen gas (a fuel gas, an oxidizing gas) to generate a power; an oxidizing gas supply system 30 for supplying air as the oxidizing gas to the fuel cell stack 20; a fuel gas supply system 40 for supplying a hydrogen gas as the fuel gas to the fuel cell stack 20; a power system 50 for controlling the charge/discharge of the power; a cooling system 60 for cooling the fuel cell stack 20; and a control unit (ECU) 90 which controls the whole system.

The fuel cell stack 20 is a solid polymer electrolyte type cell stack in which a plurality of cells are stacked in series. In the fuel cell stack 20, an oxidizing reaction of formula (1) occurs in an anode pole, and a reducing reaction of formula (2) occurs in a cathode pole. In the whole fuel cell stack 20, an electromotive reaction of formula (3) occurs.

$$H_2 \rightarrow 2H^+ + 2e^- \qquad (1)$$

$$(\tfrac{1}{2})O_2 + 2H^+ + 2e^- \rightarrow H_2O \qquad (2)$$

$$H_2 + (\tfrac{1}{2})O_2 \rightarrow H_2O \qquad (3)$$

To the fuel cell stack 20 are attached a voltage sensor 71 for detecting the output voltage of the fuel cell stack 20 and a current sensor 72 for detecting a power generation current.

The oxidizing gas supply system 30 has an oxidizing gas passage 34 through which the oxidizing gas to be supplied to the cathode pole of the fuel cell stack 20 flows, and an oxidizing off gas passage 36 through which an oxidizing off gas discharged from the fuel cell stack 20 flows. The oxidizing gas passage 34 is provided with an air compressor 32 which takes the oxidizing gas from the atmosphere through a filter 31, a humidifier 33 which humidifies the oxidizing gas to be supplied to the cathode pole of the fuel cell stack 20, and a throttle valve 35 for regulating the amount of the oxidizing gas to be supplied. The oxidizing off gas passage 36 is provided with a back pressure regulation valve 37 for regulating an oxidizing gas supply pressure, and the humidifier 33 which performs water content exchange between the oxidizing gas (a dry gas) and the oxidizing off gas (a wet gas).

The fuel gas supply system 40 has a fuel gas supply source 41; a fuel gas passage 45 through which the fuel gas to be supplied from the fuel gas supply source 41 to the anode pole of the fuel cell stack 20 flows; a circulation passage 46 for returning, to the fuel gas passage 45, a fuel off gas discharged from the fuel cell stack 20; a circulation pump 47 which feeds, to a fuel gas passage 45, the fuel off gas under pressure in the circulation passage 46; and a gas/water discharge passage 48 branched from and connected to the circulation passage 46.

The fuel gas supply source 41 is constituted of, for example, a high-pressure hydrogen tank, a hydrogen occluded alloy or the like, and receives the hydrogen gas with a high pressure (e.g., 35 MPa to 70 MPa). When a block valve 42 is opened, the fuel gas is discharged from the fuel gas supply source 41 to the fuel gas passage 45. The pressure of the fuel gas is decreased to, for example, about 200 kPa by the regulator 43 and an injector 44, and the gas is supplied to the fuel cell stack 20.

It is to be noted that the fuel gas supply source 41 may be constituted of a reformer which forms a hydrogen-rich reformed gas from a hydrocarbon-based fuel, and a high-pressure gas tank which brings the reformed gas formed by this reformer into a high-pressure state to accumulate the pressure.

The regulator 43 is a device which regulates the upstream pressure (the primary pressure) of the regulator into a preset secondary pressure, and is constituted of, for example, a mechanical pressure reduction valve or the like which decreases the primary pressure. The mechanical pressure reduction valve has a housing provided with a back pressure chamber and a pressure regulation chamber formed via a diaphragm, and has a constitution in which the primary pressure is decreased to a predetermined pressure by the back pressure of the back pressure chamber to form the secondary pressure in the pressure regulation chamber.

The injector 44 is an electromagnetic driving type opening/closing valve in which a valve body is directly driven with an electromagnetic driving force for a predetermined driving period and detached from a valve seat, whereby a gas flow rate or a gas pressure can be regulated. The injector 44 includes the valve seat having jet holes which jet a gas fuel such as the fuel gas, and also includes a nozzle body which supplies and guides the gas fuel to the jet holes, and the valve body movably received and held in an axial direction (a gas flow direction) with respect to this nozzle body to open or close the jet holes.

The gas/water discharge passage 48 is provided with a gas/water discharge valve 49. The gas/water discharge valve 49 operates in accordance with a command from the control unit 90 to discharge from the system, the fuel off gas including impurities in the circulation passage 46 and a water content. When the gas/water discharge valve 49 is opened, the concentration of the impurities in the fuel off gas of the circulation passage 46 lowers, and the concentration of hydrogen in the fuel off gas circulated through a circulation system can be raised.

The fuel off gas discharged through the gas/water discharge valve 49 is mixed with the oxidizing off gas flowing through the oxidizing off gas passage 34, and is diluted by a diluter (not shown). The circulation pump 47 is driven by a motor to circulate and supply the fuel off gas of the circulation system to the fuel cell stack 20.

The power system 50 includes a DC/DC converter 51, a battery 52, a traction inverter 53, a traction motor 54 and auxiliary machines 55. The DC/DC converter 51 is power conversion means having a function of raising a direct-current voltage supplied from the battery 52 to output the voltage to the traction inverter 53 and a function of lowering a direct-current power generated by the fuel cell stack 20 or a regenerative power collected by the traction motor 54 by regenerative braking to charge the battery 52. The charging/discharging of the battery 52 is controlled by these functions of the DC/DC converter 51. Moreover, an operation point (the output voltage, the output current) of the fuel cell stack 20 is controlled by voltage conversion control of the DC/DC converter 51.

The battery 52 functions as a storage source of an excessive power, a regenerative energy storage source during the regenerative braking, or an energy buffer during load fluctuation accompanying acceleration or deceleration of the fuel cell vehicle. As the battery 52, for example, a nickel/cadmium accumulator battery, a nickel/hydrogen accumulator battery, or a secondary battery such as a lithium secondary battery is preferable.

The traction inverter 53 is, for example, a PWM inverter driven by a pulse width modulation system, and converts the direct-current voltage output from the fuel cell stack 20 or the battery 52 into a three-phase alternate-current voltage in accordance with a control instruction from the control unit 90 to control the rotary torque of the traction motor 54. The traction motor 54 is, for example, a three-phase alternate-current motor, and constitutes a power source of the fuel cell vehicle.

The auxiliary machines 55 generically include motors arranged in units of the fuel cell system 10 (e.g., power sources for pumps and the like), inverters for driving these motors, and any type of car-mounted auxiliary machine (e.g., an air compressor, an injector, a cooling water circulation pump, a radiator or the like).

The cooling system 60 includes refrigerant passages 61, 62, 63 and 64 for circulating a refrigerant through the fuel cell stack 20; a circulation pump 65 for feeding the refrigerant under pressure; a radiator 66 for performing heat exchange between the refrigerant and outside air; a three-way valve 67 for switching a circulation path of the refrigerant; and a temperature sensor 74 for detecting a refrigerant temperature. During a usual operation after completing a warm-up operation, the opening/closing of the three-way valve 67 is controlled so that the refrigerant discharged from the fuel cell stack 20 flows through the refrigerant passages 61, 64, is cooled by the radiator 66, and then flows through the refrigerant passage 63 to flow into the fuel cell stack 20 again. On the other hand; during the warm-up operation immediately after system startup, the opening/closing of the three-way valve 67 is controlled so that the refrigerant discharged from the fuel cell stack 20 flows through the refrigerant passages 61, 62 and 63 to flow into the fuel cell stack 20 again.

The control unit 90 is a computer system including a CPU, an ROM, an RAM, an input/output interface and the like, and functions as control means for controlling the units (the oxidizing gas supply system 30, the fuel gas supply system 40, the power system 50 and the cooling system 60) of the fuel cell system 10. For example, on receiving a startup signal IG output from an ignition switch, the control unit 90 starts the operation of the fuel cell system 10 to obtain the demanded power of the whole system based on an accelerator open degree signal ACC output from an accelerator sensor, a vehicle speed signal VC output from a vehicle speed sensor and the like.

The demanded power of the whole system is a total value of a vehicle running power and an auxiliary machine power. The auxiliary machine power includes a power consumed by a car-mounted auxiliary machine (the humidifier, the air compressor, the hydrogen pump, the cooling water circulation pump or the like), a power consumed by a device (a change gear, a wheel control device, a steering device, a suspension device or the like) necessary for the running of a vehicle, a power consumed by a device arranged in a passenger space (an air conditioner, a light fixture, an audio or the like) and the like.

Moreover, the control unit 90 determines distribution of the output powers of the fuel cell stack 20 and the battery 52, calculates a power generation instruction value, and controls the oxidizing gas supply system 30 and the fuel gas supply system 40 so that the amount of the power to be generated by the fuel cell stack 20 coincides with a target power. Furthermore, the control unit 90 controls the DC/DC converter 51 to regulate the output voltage of the fuel cell stack 20, thereby controlling the operation point (the output voltage, the output current) of the fuel cell stack 20. To obtain the target vehicle speed corresponding to an accelerator open degree, the control unit 90 outputs, for example, U-phase, V-phase and W-phase alternate-current voltage instruction values as switching instructions to the traction inverter 53, and controls an output torque and a rotation number of the traction motor 54.

Figure 2:
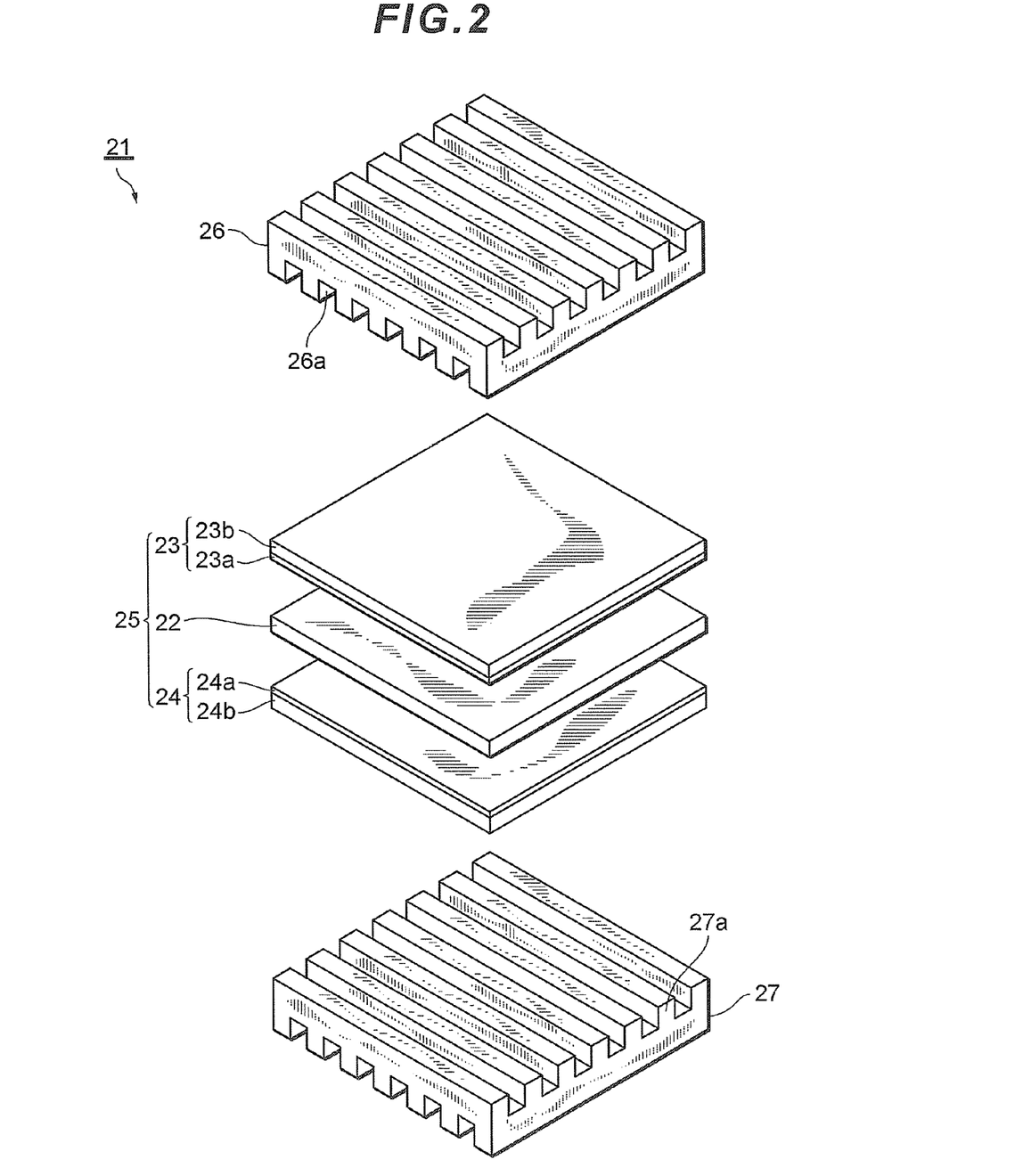
FIG. 2 is an exploded perspective view of a cell.

FIG. 2 is an exploded perspective view of a cell 21 constituting the fuel cell stack 20.

The cell 21 is constituted of an electrolytic film 22, an anode pole 23, a cathode pole 24 and separators 26, 27. The anode pole 23 and the cathode pole 24 are diffusion electrodes which sandwich the electrolytic film 22 from both sides to constitute a sandwich structure. The separators 26, 27 constituted of gas impermeable conductive members further sandwich this sandwich structure from both sides, while forming the passages of the fuel gas and the oxidizing gas between the anode pole 23 and the cathode pole 24. The separator 26 is provided with ribs 26a having recessed sections. The anode pole 23 abuts on the ribs 26a to close openings of the ribs 26a, thereby forming a fuel gas passage. The separator 27 is provided with ribs 27a having recessed sections. The cathode pole 24 abuts on the ribs 27a to close openings of the ribs 27a, thereby forming an oxidizing gas passage.

The anode pole 23 has a catalyst layer 23a including carbon powder carrying a platinum-based metal catalyst (Pt, Pt—Fe, Pt—Cr, Pt—Ni, Pt—Ru or the like) as a main component, the catalyst layer coming in contact with the electrolytic film 22; and a gas diffusion layer 23b formed on the surface of the catalyst layer 23a and having both gas permeability and electron conductivity. Similarly, the cathode pole 24 has a catalyst layer 24a and a gas diffusion layer 24b. More specifically, as to the catalyst layers 23a, 24a, the carbon powder carrying platinum or an alloy made of platinum and another metal is dispersed in an appropriate organic solvent, and an electrolytic solution is added as much as an appropriate amount, pasted and screen-printed on the electrolytic film 22. The gas diffusion layers 23b, 24b are formed of carbon cloth woven with a thread made of a carbon fiber, carbon paper or carbon felt. The electrolytic film 22 is a proton conductive ion exchange membrane formed of a solid polymer material, for example, a fluorine-based resin, and exerts satisfactory electric conductivity in a wet state. The electrolytic film 22, the anode pole 23 and the cathode pole 24 form a membrane-electrode assembly 25.

Figure 3:
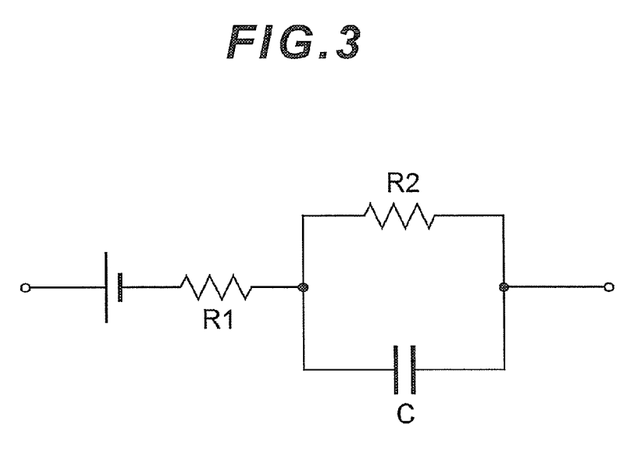
FIG. 3 is an equivalent circuit diagram showing cell electric characteristics.

FIG. 3 is an equivalent circuit diagram showing the electric characteristics of the cell 21.

The equivalent circuit of the cell 21 has a circuit constitution where R1 is connected in series to a circuit in which R2 and C are connected to each other in parallel. Here, R1 corresponds to an electric resistor of the electrolytic film 22, and R2 corresponds to a resistor into which an activation overvoltage and a diffusion overvoltage are converted. C corresponds to an electric double layer capacity formed on an interface between the anode pole 23 and the electrolytic film 22 and an interface between the cathode pole 24 and the electrolytic film 22. When a sinusoidal current having a predetermined frequency is applied to this equivalent circuit, the response of the voltage is delayed with respect to the change of the current.

Figure 4:
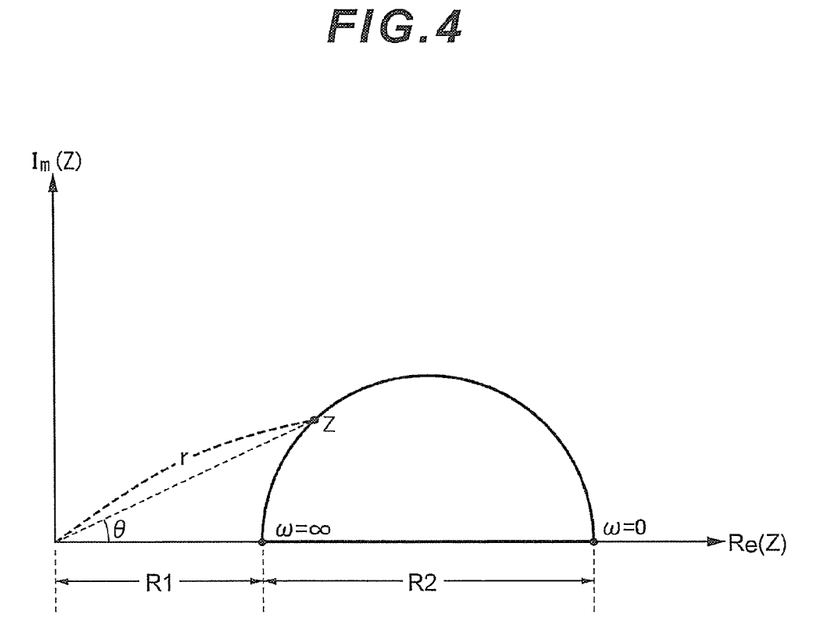
FIG. 4 is a graph showing an AC impedance of a fuel cell stack on a complex plane.

FIG. 4 is a graph showing the AC impedance of the fuel cell stack 20 on a complex plane. The abscissa indicates a real part of the AC impedance, and the ordinate indicates an imaginary part of the AC impedance. $\omega$ is the angular frequency of the sinusoidal current.

When a sinusoidal signal having a high to low frequency is applied to the equivalent circuit shown in FIG. 3, the graph shown in FIG. 4 is obtained. The AC impedance in a case where the frequency of the sinusoidal signal is infinitely high ($\omega=\infty$) is represented by R1. The AC impedance in a case where the frequency of the sinusoidal signal is very low ($\omega=0$) is represented by R1+R2. The AC impedance obtained at a time when the frequency of the sinusoidal signal is changed between the high frequency and the low frequency draws a semicircle as shown in FIG. 4.

When such an AC impedance process is used, R1 and R2 in the equivalent circuit of the fuel cell stack 20 can be measured separately from each other. When R1 is larger than a predetermined value and the output of the fuel cell stack 20 lowers, the electrolytic film 22 dries to increase the resistance overvoltage, and it can be judged that the lowering of the conductivity is a cause for the lowering of the output. When R2 is larger than a predetermined value and the output of the fuel cell stack 20 lowers, water is excessively present on the surfaces of the electrodes, and it can be judged that the increase of the diffusion overvoltage is the cause.

Figure 5:
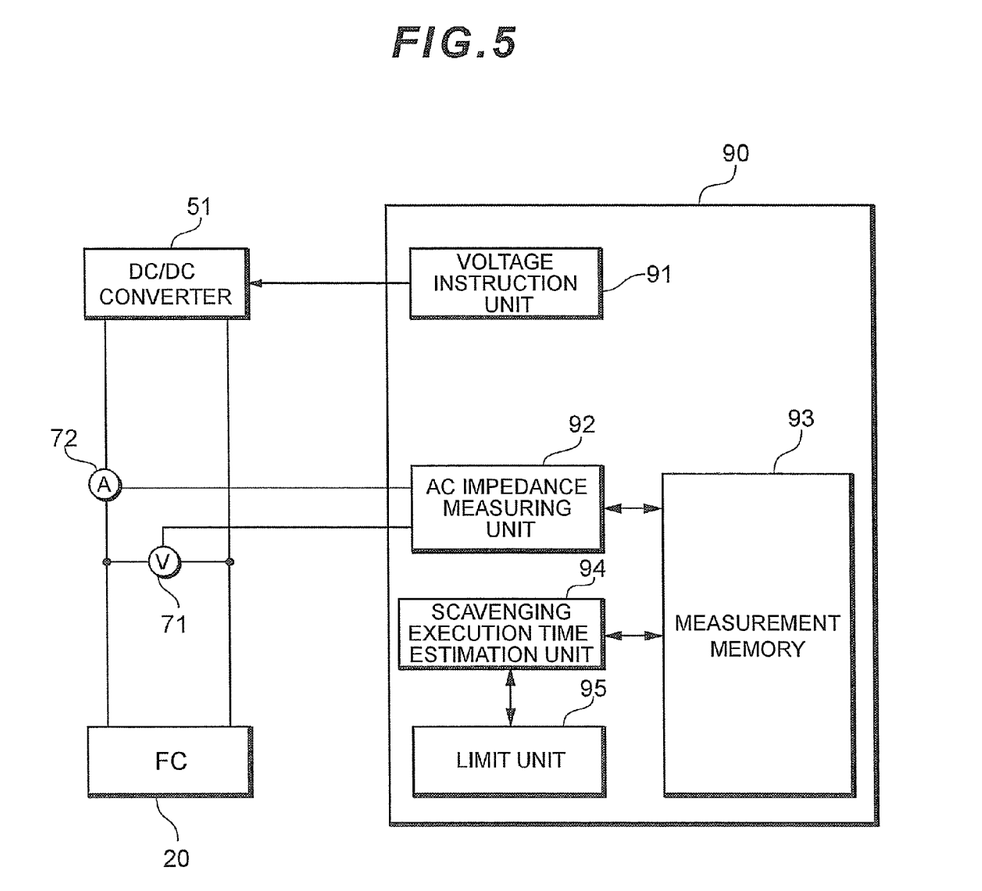
FIG. 5 is a functional block diagram of a control unit associated with scavenging processing.

FIG. 5 is a functional block diagram of the control unit 90 associated with scavenging processing.

The control unit 90 includes a voltage instruction unit 91, an AC impedance measuring unit 92, a measurement memory 93, a scavenging execution time estimation unit 94 and a limit unit 95, and these units cooperate to function as scavenging control means.

The AC impedance measurement of the fuel cell stack 20 by the control unit 90 is performed by the following procedure.

(1) The voltage instruction unit 91 superimposes the sinusoidal signal on a predetermined direct-current voltage to form a voltage instruction value, to output such a voltage instruction value to the DC/DC converter 51.

(2) The DC/DC converter 51 operates based on the voltage instruction value, and converts the direct-current power accumulated in the battery 52 into an alternate-current power to apply the sinusoidal signal to the fuel cell stack 20.

(3) The AC impedance measuring unit 92 samples a response voltage detected by the voltage sensor 71 and a response current detected by the current sensor 72 with a predetermined sampling rate, performs fast Fourier transform processing (FFT processing), divides the response voltage and the response current into real components and imaginary components, respectively, divides the response voltage subjected to the FFT processing by the response current subjected to the FFT processing to calculate the real component and the imaginary component of the AC impedance, and calculates a distance r and a phase angle θ from an origin of the complex plane. When the response voltage and the response current are measured while continuously changing the frequency of the sinusoidal signal applied to the fuel cell stack 20, the AC impedance of the fuel cell stack 20 can be calculated.

It is to be noted that the current flowing through the fuel cell stack 20 involves the movement of charge due to a chemical reaction. Therefore, when the amplitude of an alternate-current signal is increased, a reaction amount (a gas use ratio with respect to the amount of the supplied gas fluctuates. When the gas use ratio fluctuates, an error is sometimes generated in the measurement of the AC impedance. In consequence, the alternate-current component of the signal applied to the fuel cell stack 20 during the measurement of the AC impedance is preferably about several % of the direct-current component.

The AC impedance measuring unit 92 stores the value of the AC impedance measured as described above in the measurement memory 93. The scavenging execution time estimation unit 94 estimates a scavenging execution time based on the value of the AC impedance stored in the measurement memory 93. When the scavenging execution time estimated by the scavenging execution time estimation unit 94 exceeds a maximum scavenging time, the limit unit 95 limits the scavenging execution time to the maximum scavenging time. The maximum scavenging time may be referred to as a scavenging timeout time.

Next, a method of estimating the scavenging execution time will be described with reference to FIGS. 6 to 8.

Figure 6:
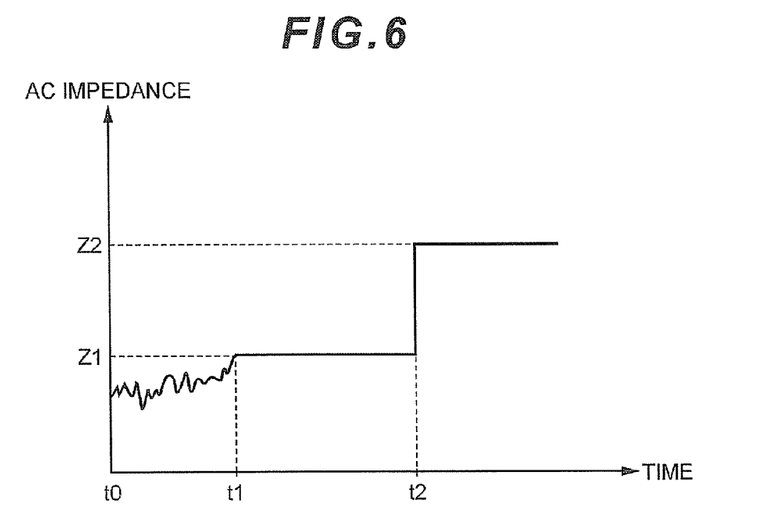
FIG. 6 is a graph showing the changes of the AC impedance with an elapse of time.

FIG. 6 is a graph showing the changes of the AC impedance with an elapse of time. The abscissa indicates time, and the ordinate indicates the value of the AC impedance of the fuel cell stack 20. A time t1 is a timing at which an ignition switch turns off. In a period from a time t0 to the time t1, the fuel cell system 10 has a power generating state, and the AC impedance measuring unit 92 calculates the AC impedance of the fuel cell stack 20 at a fixed cycle interval, and stores the value of the AC impedance in the measurement memory 93. The value of the AC impedance stored in the measurement memory 93 is successively updated to the latest value.

When the ignition switch turns off at the time t1 and the control unit 90 is instructed to stop the operation, the control unit 90 stores an AC impedance value Z1 measured at the time t1 in the measurement memory 93 to start scavenging processing. The scavenging processing is processing of driving the air compressor 32 as a scavenging device and allowing pressurized air as a scavenging gas to flow through a gas channel in the fuel cell stack 20, thereby appropriately regulating a wet state in the gas channel. When a large water content remains in the gas channel, starting properties at the next startup lower, and additionally in a low-temperature environment, pipes, valves and the like sometimes break down owing to the freezing water content. On the other hand, when the fuel cell stack 20 is deficient in the water content, the conductivity of the electrolytic film 22 lowers, thereby causing the decrease of a power generation efficiency. Therefore, the scavenging execution time estimation unit 94 calculates the value of the AC impedance at a time when the inside of the fuel cell stack 20 is brought into an optimum wet state, sets the calculated AC impedance value as a target AC impedance, and estimates the scavenging execution time for matching the AC impedance of the fuel cell stack 20 with the target AC impedance.

At a time t2 when the time T1 has elapsed from the start of the scavenging processing, the control unit 90 measures an AC impedance Z2 of the fuel cell stack 20, and updates the latest AC impedance value stored in the measurement memory 93 from Z1 to Z2. From the viewpoint of the improvement of the estimation precision of the scavenging execution time, the time T1 is preferably a time when it is anticipated that the water content in the fuel cell stack 20 decreases as much as possible. From such a viewpoint, the temperature change rate of the fuel cell stack 20 is detected, and a time required to lower the absolute value of the temperature change rate below a predetermined threshold value is preferably the time T1. When the absolute value of the temperature change rate is below the predetermined threshold value, it can be presumed that the amount of vaporized water in the fuel cell stack 20 reaches a saturated state to achieve an adequate dry state.

Figure 7:
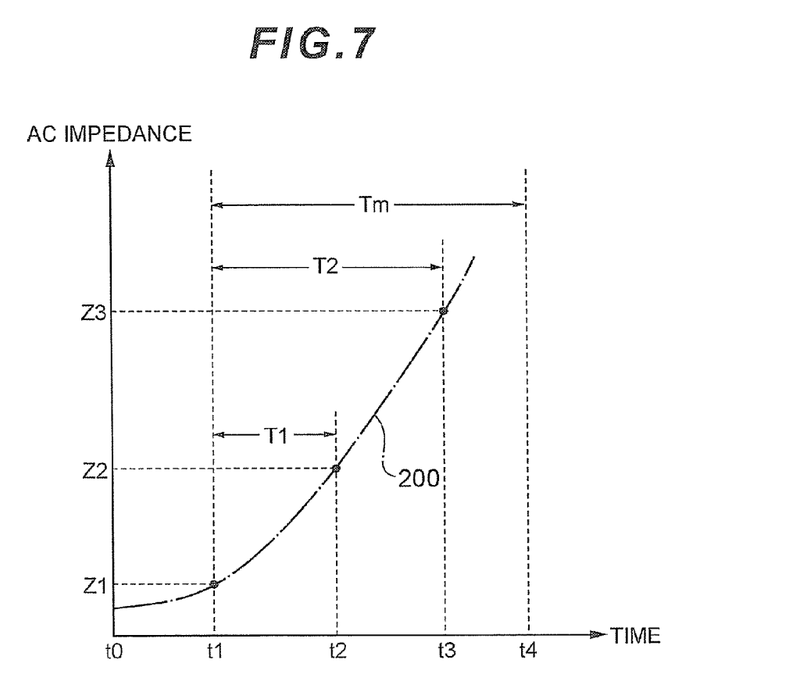
FIG. 7 is a graph showing the changes of the AC impedance with the elapse of time.

As shown in FIG. 7, the scavenging execution time estimation unit 94 estimates a scavenging execution time T2 required to match the AC impedance with a target AC impedance Z3 by use of an interpolating function 200 based on the AC impedance Z1 measured at the time t1 and the AC impedance Z2 measured at the time t2. The interpolating function 200 is a function for estimating a target coordinate (t3, Z3) based on at least two measurement coordinates, for example, (t1, Z1) and (t2, Z2), and is obtained by an experiment or the like. As the interpolating function 200, for example, a quadratic function is preferable. It has been confirmed in the experiment performed by the present inventor that when the amount of the scavenging gas supplied per unit time and a stack temperature are fixed, the value of the AC impedance increases in a quadratic function manner. Examples of the quadratic function include $Z=at^2+Z0$, in which t is the time, Z is the AC impedance, and a and Z0 are positive constants. When two measurement coordinates are substituted into the quadratic function, the values of the constants a and Z0 are determined. The solution of t at a time when Z=Z3 is a scavenging completion time t3. The scavenging execution time T2 can be calculated by the scavenging execution time T2 = the scavenging completion time t3 − the scavenging start time t1. When the scavenging execution time T2 estimated in this manner is shorter than a maximum scavenging time Tm, the scavenging processing is performed from the time t2 to the time t3 when the scavenging execution time T2 has elapsed.

Figure 8:
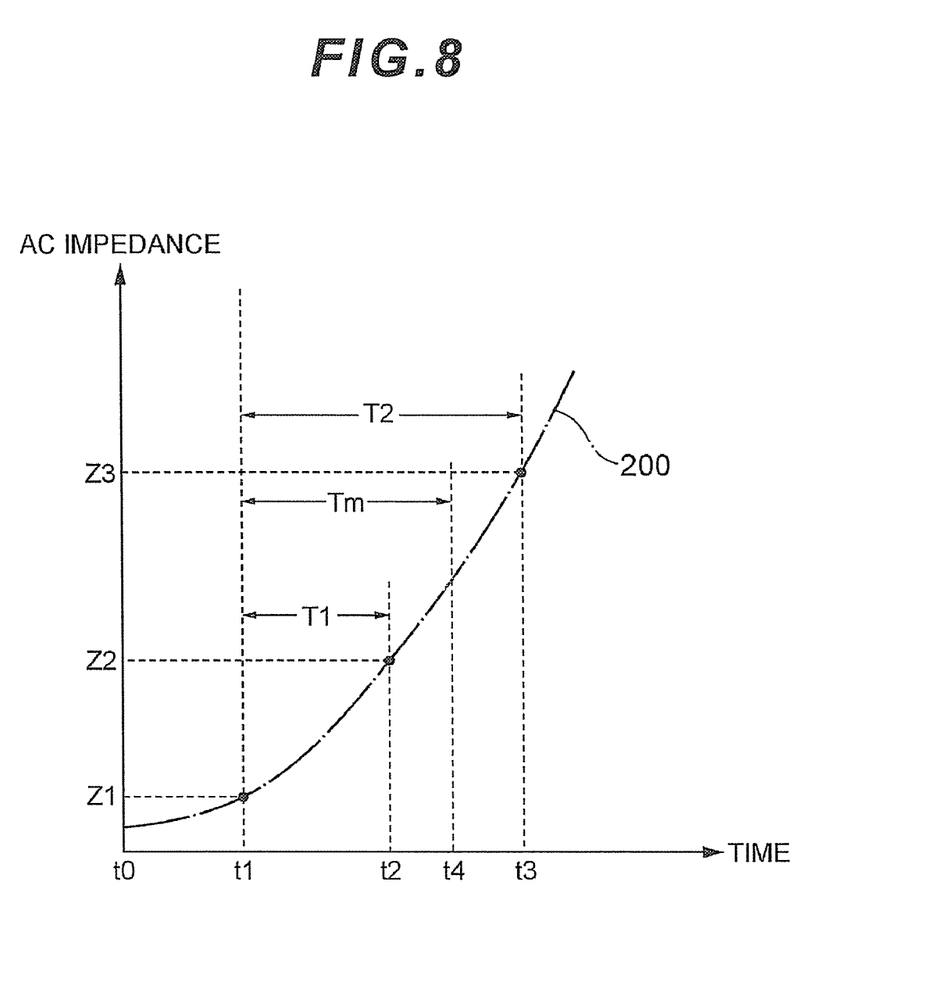
FIG. 8 is a graph showing the changes of the AC impedance with the elapse of time.

On the other hand, as shown in FIG. 8, when the scavenging execution time T2 is longer than the maximum scavenging time Tm, the limit unit 95 limits the scavenging execution time to the maximum scavenging time Tm, and performs the scavenging processing from the time t1 to a time t4 when the maximum scavenging time Tm has elapsed. In a case where a large water content remains in the fuel cell stack 20 at a scavenging start, even when the scavenging processing is performed, it is difficult to sufficiently dry the stack. Therefore, in such a case, the scavenging processing is performed until the maximum scavenging time Tm elapses from the scavenging start, whereby the water content in the fuel cell stack 20 can be decreased as much as possible in preparation for the next startup.

It is to be noted that in a case where the scavenging execution time T2 is longer than the maximum scavenging time Tm, even when the electrolytic film 22 insufficiently dries at the completion of the scavenging processing, the limit unit 95 limits the scavenging execution time to the maximum scavenging time Tm, and prohibits such scavenging processing that the scavenging execution time exceeds the maximum scavenging time Tm. Here, when the electrolytic film 22 insufficiently dries, the water content remaining in the fuel cell stack 20 exceeds a predetermined amount Qth. There is a correlation between the water content in the fuel cell stack 20 and the AC impedance. Therefore, in a case where the AC impedance of the fuel cell stack 20 is less than the target AC impedance, it can be judged that the electrolytic film 22 insufficiently dries Here, the target AC impedance is an AC impedance at a time when the optimum wet state (the remaining water content Qth) is achieved in the fuel cell stack 20.

Even in a case where it is estimated before the start of the scavenging that the AC impedance of the fuel cell stack 20 at the time when the maximum scavenging time Tm has elapsed from the scavenging start is less than the target AC impedance, or even in a case where the AC impedance of the fuel cell stack 20 actually measured at the time when the maximum scavenging time Tm has elapsed from the scavenging start is less than the target AC impedance, the limit unit 95 limits the scavenging execution time to the maximum scavenging time Tm.

It is to be noted that since the air compressor 32 is driven by the power from the battery 52, the time length of the maximum scavenging time Tm may be set to an appropriate value based on the state of charge (SOC) of the battery 52.

In the above embodiment, a utilizing configuration in which the fuel cell system 10 is used as the car-mounted power source system has been illustrated, but the utilizing configuration of the fuel cell system 10 is not limited to this example. For example, the fuel cell system 10 may be mounted as a power source of a mobile body (a robot, a ship, an airplane or the like) other than the fuel cell vehicle. Moreover, the fuel cell system 10 according to the present embodiment may be used as a power generation facility (a stational power generation system) of a housing, a building or the like.

Industrial Applicability

According to the present invention, scavenging processing is continued until a scavenging execution time reaches a maximum scavenging time, whereby a water content in a fuel cell can be decreased as much as possible in preparation for the next startup.

The invention claimed is:

1. A fuel cell system comprising:
   a fuel cell;
   a scavenging device which supplies a scavenging gas to the fuel cell;
   an AC impedance measuring unit programmed to measure an AC impedance of the fuel cell at a scavenging start and to measure an AC impedance of the fuel cell at a time when a predetermined time has elapsed from the scavenging start;
   a scavenging execution time estimation unit programmed to estimate a scavenging execution time based on the AC impedance measured at the scavenging start, the AC impedance measured at the time when the predetermined time has elapsed from the scavenging start, and the predetermined time; and
   a limit unit programmed to limit the scavenging execution time to a predetermined maximum scavenging time if the scavenging execution time exceeds a maximum scavenging time.

2. The fuel cell system according to claim 1, wherein the scavenging execution time estimation unit is further programmed to estimate the scavenging execution time by use of an interpolating function.

3. The fuel cell system according to claim 1, wherein the time when the predetermined time has elapsed from the scavenging start is a time when the absolute value of the temperature change rate of the fuel cell becomes less than a predetermined threshold value.

4. The fuel cell system according to claim 1, wherein the predetermined time is a predetermined fixed time.

5. The fuel cell system according to claim 1, wherein the limit unit is further programmed to limit the scavenging execution time to the maximum scavenging time when the scavenging execution time estimated by the scavenging execution time estimation unit exceeds the predetermined maximum scavenging time, even if the AC impedance of the fuel cell at a scavenging completion is less than a target AC impedance.

* * * * *